(12) United States Patent
Schlosser

(10) Patent No.: US 6,229,847 B1
(45) Date of Patent: May 8, 2001

(54) SIGNAL QUALITY MEASUREMENT DEVICE

(75) Inventor: Thomas W. Schlosser, San Diego, CA (US)

(73) Assignee: The United States of America as represented by the Secretary of the Navy

( * ) Notice: Subject to any disclaimer, the term of this patent is extended or adjusted under 35 U.S.C. 154(b) by 0 days.

(21) Appl. No.: 08/997,914

(22) Filed: Dec. 24, 1997

(51) Int. Cl.$^7$ ............................. H04B 3/46; G01R 13/00
(52) U.S. Cl. ................................. 375/227; 702/69
(58) Field of Search ..................... 375/227, 224, 375/222; 702/66, 69, 64, 112, 189; 455/226.1, 226.3, 44

(56) References Cited

U.S. PATENT DOCUMENTS

| | | | |
|---|---|---|---|
| 3,350,643 | 10/1967 | Web | 702/69 |
| 4,305,150 | 12/1981 | Richmond et al. | 714/709 |
| 4,317,206 | 2/1982 | Nossen | 375/224 |
| 4,335,361 | 6/1982 | Acker | 330/285 |
| 4,387,461 | 6/1983 | Evans | 714/704 |
| 4,542,514 | 9/1985 | Watanabe | 375/225 |
| 4,688,234 | 8/1987 | Robinton | 375/227 |
| 4,696,057 | 9/1987 | Otani | 455/226.3 |
| 4,835,790 | 5/1989 | Yoshida et al. | 375/227 |
| 5,202,901 | * 4/1993 | Chennkeshu et al. | 375/331 |
| 5,440,582 | 8/1995 | Birchler et al. | 375/227 |
| 5,440,590 | 8/1995 | Birchler et al. | 375/347 |
| 5,442,462 | * 8/1995 | Guissin | 358/463 |
| 5,446,771 | 8/1995 | Lin | 375/224 |
| 5,675,498 | * 10/1997 | White | 702/66 |
| 5,771,443 | * 6/1998 | Nagano et al. | 455/115 |
| 6,075,797 | * 6/2000 | Thomas | 370/468 |

\* cited by examiner

*Primary Examiner*—Chi Pham
*Assistant Examiner*—Khai Tran
(74) *Attorney, Agent, or Firm*—Harvey Fendelman; Michael A. Kagan; Eric James Whitesell

(57) ABSTRACT

A signal quality measurement device of the present invention comprises a deviation function for determining a measured deviation value from envelope amplitude samples of a communications signal and a table function of deviation values versus signal-to-noise ratios computed from a statistical model of atmospheric noise for finding a signal-to-noise ratio that corresponds to the measured deviation value.

9 Claims, 3 Drawing Sheets

| m=1 $\sigma$ | SNR (NORMAL) | $V_{avg}$ | $V_{rms}$ | $V_d$ | BFSK BER |
|---|---|---|---|---|---|
| NOISE ONLY | NOISE ONLY | 1.2533 | 1.4142 | 1.0491 | 0.5 |
| 4 | 0.3536 | 5.0912 | 5.7444 | 1.0485 | 0.362 |
| 2 | 0.7071 | 2.6608 | 2.9998 | 1.0417 | 0.2398 |
| 1 | 1.4142 | 1.5486 | 1.7321 | 0.9726 | 0.0788 |
| 0.8319 | 1.7 | 1.3889 | 1.544 | 0.9196 | 0.0446 |
| 0.7071 | 2 | 1.2819 | 1.4142 | 0.8531 | 0.0228 |
| 0.5657 | 2.5 | 1.1772 | 1.2806 | 0.7311 | 0.0062 |
| 0.5 | 2.828 | 1.1362 | 1.2247 | 0.6519 | $2.367 \times 10^{-3}$ |
| 0.25 | 5.6569 | 1.0318 | 1.0607 | 0.2396 | $<10^{-7}$ |
| SIGNAL ONLY | SIGNAL ONLY | 1 | 1 | 0 | 0 |

FIG. 1

SIGNAL QUALITY MEASUREMENT DEVICE

LICENSING INFORMATION

The invention described below is assigned to the United States Government and is available for licensing commercially. Technical and licensing inquiries may be directed to Harvey Fendelman, Legal Counsel For Patents, SPAWARSYSCEN SAN DIEGO CODE D0012 Room 103, 53560 Hull Street, San Diego, Calif. 92152-5001; telephone no. (619) 553-3001; fax no. (619) 553-3821.

BACKGROUND OF THE INVENTION

The present invention relates to measurement of the signal-to-noise ratio of communications signals. More specifically, but without limitation thereto, the present invention relates to a device for finding the signal-to-noise ratio of a constant envelope amplitude communications signal having a known modulation scheme.

Current techniques for measuring signal-to-noise ratio require extracting information from the signal, such as bit error rate devices. Examples of such devices may be found, for example, in U.S. Pat. No. 5,440,582 issued on Aug. 8, 1995 to Birchler et al. This device estimates signal quality from a stream of demodulated information extracted from the received signal. U.S. Pat. No. 4,835,790 issued on May 30, 1989 to Yoshida et al. discloses a specially clocked analog-to-digital converter to estimate the quality of a phase-shift keyed signal. U.S. Pat. No. 3,350,643 discloses a device that processes a stream of demodulated data from a digitally encoded transmission to estimate signal quality.

A continued need exists for a device that can find signal-to-noise ratio of a communications signal without the difficulty of having to first extract the transmitted information from the received signal.

SUMMARY OF THE INVENTION

A signal quality measurement device of the present invention is directed to overcoming the problems described above, and may provide further related advantages. No embodiment of the present invention described herein shall preclude other embodiments or advantages that may exist or become obvious to those skilled in the art.

A signal quality measurement device of the present invention comprises a deviation function for determining a measured deviation value from envelope amplitude samples of a communications signal and a table function of deviation values versus signal-to-noise ratios computed from a statistical model of atmospheric noise for finding a signal-to-noise ratio that corresponds to the measured deviation value.

An advantage of the signal quality measurement device of the present invention is that extraction of information conveyed by the communications signal is unnecessary, avoiding the need for decryption devices for encrypted data.

Another advantage is that signal-to-noise ratio may be estimated with very few components.

The features and advantages summarized above in addition to other aspects of the present invention will become more apparent from the description, presented in conjunction with the following drawings.

BRIEF DESCRIPTION OF THE DRAWINGS

FIG. 1 is a table of computed deviation values and corresponding signal-to-noise ratios.

DESCRIPTION OF THE INVENTION

Figure 2:
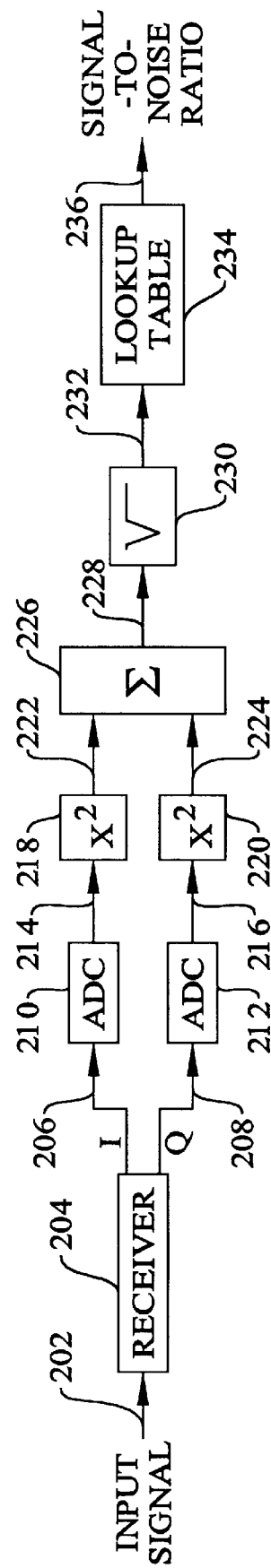
FIG. 2 is a diagram of a signal quality measurement device of the present invention.

The following description is presented solely for the purpose of disclosing how the present invention may be made and used. The scope of the invention is defined by the claims.

A primary source of interference in radio signals is atmospheric noise, typically modeled as a random phenomenon with defined statistical parameters. The statistical parameters used to define atmospheric noise include Vavg, the average voltage measured by a receiving antenna, Vrms, the root-mean-square antenna voltage, and Vd, the antenna voltage deviation. The equations for these parameters may be expressed as:

$$V_{rms} = \sqrt{\frac{1}{N}\sum_{j=1}^{N} X_j^2}$$

$$V_{avg} = \frac{1}{N}\sum_{j=1}^{N} x_j$$

$$V_d = 20\log\frac{V_{rms}}{V_{avg}}$$

where $x_j$ is the jth sample of the received signal amplitude envelope and N is the number of samples over which the statistics are calculated.

For a Gaussian random variable with a mean of 0 and a variance of 1, the associated Rayleigh probability density function has a mean of $$\sqrt{\frac{\Pi}{2}}$$

and a standard deviation of $\sqrt{2}$. For such a signal, $$V_{avg} = \sqrt{\frac{\Pi}{2}} \cong 1.2533$$

$$V_{rms} = \sqrt{2} \approx 1.4142$$

$$V_d = 20\log\frac{V_{rms}}{V_{avg}} \cong 20\log\frac{2}{\sqrt{\Pi}} \cong 1.049.$$

For a constant amplitude sine wave, $V_{avg}$=Vrms and $V_d$=20 log(1)=0. $V_d$ thus ranges from 0 for pure signal to 1.0491 for pure noise, with various ratios of signal to noise lying between these limits. From Helstrom's *Probability and Stochastic Processes for Engineers*, the amplitude of a constant amplitude CW signal with Gaussian noise has a distribution function that may be expressed as:

$$P(A) = \frac{A}{\sigma^2} e^{-\frac{A^2+m^2}{2\sigma^2}} I_0\left(\frac{ma}{\sigma^2}\right)$$

where m is the amplitude of the CW signal and σ is the standard deviation of the Gaussian noise. $I_0$ is the Bessel function. For this case, the signal-to-noise ratio SNR may be calculated as:

$$SNR = 20 \log \frac{m}{\sigma}.$$

$V_{avg}$ and $V_{rms}$ may be calculated from the following:

$$V_{avg} = \int_0^\infty A \times P(A) dA$$

$$= \int_0^\infty \frac{A}{\sigma^2} e^{-\frac{A^2+m^2}{2\sigma^2}} I_0\left(\frac{ma}{\sigma^2}\right) dA$$

$$= \int_0^\infty \frac{A}{\sigma^2} e^{-\frac{A^2+m^2}{2\sigma^2}} \sum_{k=0}^\infty \frac{\left(\frac{1}{4}\left(\frac{ma}{\sigma^2}\right)^2\right)^k}{(k!)^2}$$

$$V_{rms} = \sqrt{\int_0^\infty A^2 \times P(A) dA}$$

$$= \sqrt{\int_0^\infty \frac{A^3}{\sigma^2} e^{-\frac{A^2+m^2}{2\sigma^2}} I_0\left(\frac{ma}{\sigma^2}\right) dA}$$

$$= \sqrt{\int_0^\infty \frac{A^3}{\sigma^2} e^{-\frac{A^2+m^2}{2\sigma^2}} \sum_{k=0}^\infty \frac{\left(\frac{1}{4}\left(\frac{ma}{\sigma^2}\right)^2\right)^k}{(k!)^2} dA}$$

The values for $V_{avg}$ and $V_{rms}$ shown in FIG. 1 were computed from an approximation to the integral. The detection characteristic of the signal-to-noise ratio for the matched filter is a normally distributed random variable having a variance that is about half the variance of the Rayleigh-Rice distribution.

For some modes of encrypted communications, unencrypted synchronization bits of known sign may be included in the communications signal. These synchronization bits may be used to provide an additional measure of signal quality according to well known techniques.

Electrical impulses generated by, for example, lightning storms may result in excessively large values of $V_d$. A way to prevent this distortion is to perform a running calculation of $V_{avg}$, $V_{rms}$. The standard deviation for the Nth sample may then be defined as $$\sigma_{x,N} = \sqrt{\frac{1}{N} \sum_{j=1}^N (x_j - V_{avg,N})^2}$$

where x is a sample of the communications signal, j is a time index of the sample, N is the total number of samples, and $V_{avg,N}$ is the running average.

A typical range from 1 to N is 100, and may be adjusted according to the nature of the atmospheric disturbances encountered.

FIG. 2 is a block diagram of a signal quality measurement device 200 for finding the signal-to-noise ratio corresponding to the measured deviation of the signal amplitude samples. Communications signal 202 is input by receiver 204. Receiver 204 outputs I and Q baseband signals 206 and 208 respectively. Analog-to-digital converters 210 and 212 digitize I and Q baseband signals 206 and 208 respectively. Squarers 218 and 220 calculate squared amplitudes 222 and 224 of digitized I and Q baseband signals 214 and 216 respectively. Squared amplitudes 222 and 224 are summed by summing function 226. Deviation 232 is calculated from squared amplitude sum 228 by square root function 230. Lookup table 234 then finds signal-to-noise ratio 236 corresponding to deviation 232. Signal-to-noise ratio 236 is an estimate of the quality of communications signal 202.

Figure 3:
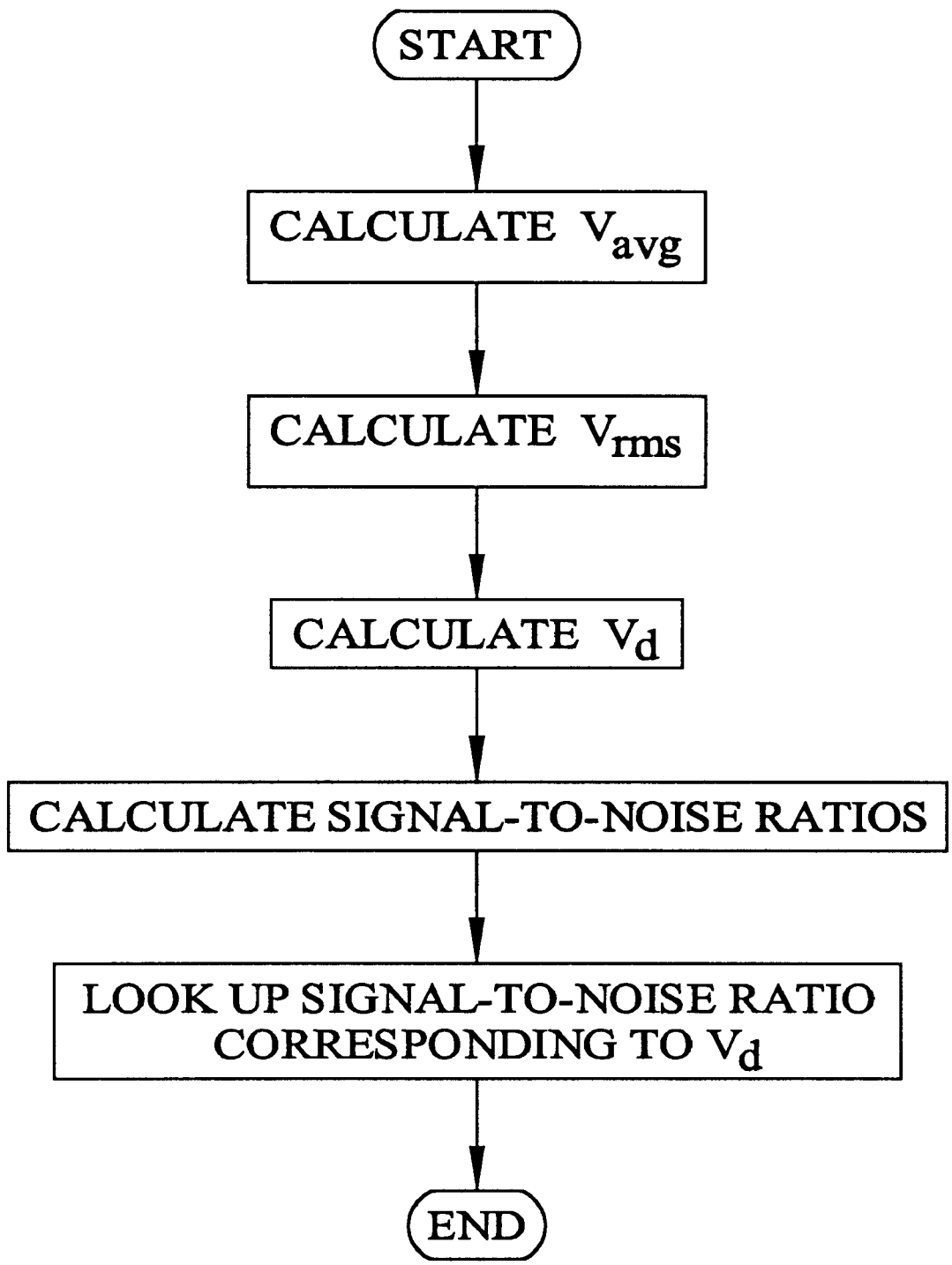
FIG. 3 is a flowchart of a method of the present invention for estimating the signal quality of a communications signal.

FIG. 3 is a flowchart of an exemplary computer program for estimating the quality of a communications signal from the amplitude of the signal and the variance of the Gaussian noise. $V_{avg}$ and $V_{rms}$ are calculated from the following steps:

$$V_{avg} = \int_0^\infty A \times P(A) dA$$

$$= \int_0^\infty \frac{A}{\sigma^2} e^{-\frac{A^2+m^2}{2\sigma^2}} I_0\left(\frac{ma}{\sigma^2}\right) dA$$

$$= \int_0^\infty \frac{A}{\sigma^2} e^{-\frac{A^2+m^2}{2\sigma^2}} \sum_{k=0}^\infty \frac{\left(\frac{1}{4}\left(\frac{ma}{\sigma^2}\right)^2\right)^k}{(k!)^2}$$

$$V_{rms} = \sqrt{\int_0^\infty A^2 \times P(A) dA}$$

$$= \sqrt{\int_0^\infty \frac{A^3}{\sigma^2} e^{-\frac{A^2+m^2}{2\sigma^2}} I_0\left(\frac{ma}{\sigma^2}\right) dA}$$

$$= \sqrt{\int_0^\infty \frac{A^3}{\sigma^2} e^{-\frac{A^2+m^2}{2\sigma^2}} \sum_{k=0}^\infty \frac{\left(\frac{1}{4}\left(\frac{ma}{\sigma^2}\right)^2\right)^k}{(k!)^2} dA}$$

$V_d = 20 \log(V_{rms}/V_{avg})$

The signal-to-noise ratio corresponding to $V_d$ is then found from the lookup table of FIG. 1.

Other modifications, variations, and applications of the present invention may be made in accordance with the above teachings other than as specifically described to practice the invention within the scope of the following claims.

I claim:

1. A signal quality measurement device comprising:
   a receiver for generating I and Q baseband amplitudes from a communications signal;
   an analog-to-digital converter coupled to the receiver for digitizing the I and Q baseband amplitudes, respectively;
   a squaring function coupled to the analog-to-digital converter for squaring the digitized I and Q baseband amplitudes, respectively;
   a summing function coupled to the squaring function for summing the squared I and Q baseband amplitudes;
   a square root function coupled to the summing function for calculating an amplitude deviation of the communications signal;
   and a lookup table function for finding a signal-to-noise ratio corresponding to the amplitude deviation.

2. A signal quality measurement device comprising:
   deviation function means for determining a deviation value from envelope amplitude samples of a communications signal;
   and table function means for finding a signal-to-noise ratio corresponding to said deviation value from a statistical model of atmospheric noise.

3. The signal quality measurement device of claim 2 wherein the communications signal has a substantially constant envelope amplitude and a given modulation scheme.

4. The signal quality measurement device of claim 2 further comprising a communications receiver for receiving the communications signal and to provide the envelope amplitude samples.

5. The signal quality measurement device of claim 2 wherein the envelope amplitude samples comprise in-phase and quadrature components of a basebanded communications signal.

6. A signal quality measurement device comprising:

deviation function means for determining a deviation value from envelope amplitude samples of a communications signal;

and table function means for finding a signal-to-noise ratio corresponding to said deviation value from a statistical model of atmospheric noise;

wherein said deviation function means determines said deviation value $V_d$ substantially according to $$V_{avg} = \frac{1}{N}\sum_{n=1}^{N} x_j,$$

$$V_{rms} = \sqrt{\frac{1}{N}\sum_{j=1}^{N} x_j^2}, \text{ and}$$

$$V_d = 20\log\left(\frac{V_{rms}}{V_{avg}}\right)$$

wherein $x_j$ is the jth envelope amplitude sample of said communications signal;

and N is a number of samples over which $V_d$ is calculated.

7. A signal quality measurement device comprising:

deviation function means for determining a deviation value from envelope amplitude samples of a communications signal;

and table function means for finding a signal-to-noise ratio corresponding to said deviation value from a statistical model of atmospheric noise;

wherein said deviation value $V_d$ and signal-to-noise ratio SNR are computed substantially by $$V_{avg} = \int_0^\infty \frac{A^2}{\sigma^2} e^{-\frac{A^2+m^2}{2\sigma^2}} \sum_{k=0}^{\infty} \frac{\left(\frac{1}{4}\left(\frac{mA}{\sigma^2}\right)^2\right)^k}{(k!)^2} dA,$$

$$V_{rms} = \sqrt{\int_0^\infty \frac{A^3}{\sigma^2} e^{-\frac{A^2+m^2}{2\sigma^2}} \sum_{k=0}^{\infty} \frac{\left(\frac{1}{4}\left(\frac{mA}{\sigma^2}\right)^2\right)^k}{(k!)^2} dA},$$

-continued $$V_d = 20\log\frac{Vrms}{Vavg},$$

and SNR=20 log $m/\sigma$ for values of m and σ wherein:

m is a selected envelope amplitude;

and σ is a selected standard deviation of said atmospheric noise.

8. A method for measuring signal quality of a communications signal comprising the following steps:

determining a measured deviation value from envelope amplitude samples of the communications signal;

and finding a corresponding signal-to-noise ratio from a table of deviation values vs. signal-to-noise ratios computed from a statistical model of atmospheric noise.

9. A signal quality measurement device comprising:

a receiver for generating I and Q baseband amplitudes from a communications signal;

an analog-to-digital converter coupled to the receiver for digitizing the I and Q baseband amplitudes, respectively;

a squaring function coupled to the analog-to-digital converter for squaring the digitized I and Q baseband amplitudes, respectively;

a summing function coupled to the squaring function for summing the squared I and Q baseband amplitudes;

a square root function coupled to the summing function for calculating an amplitude deviation of the communications signal;

and a lookup table function for finding a signal-to-noise ratio corresponding to the amplitude deviation;

wherein the signal quality measurement device performs the following steps:

determining a measured deviation value from envelope amplitude samples of a communications signal;

and finding a corresponding signal-to-noise value from a table of deviation values vs. signal-to-noise ratios computed from a statistical model of atmospheric noise.

* * * * *